United States Patent Office 3,333,473
Patented Aug. 1, 1967

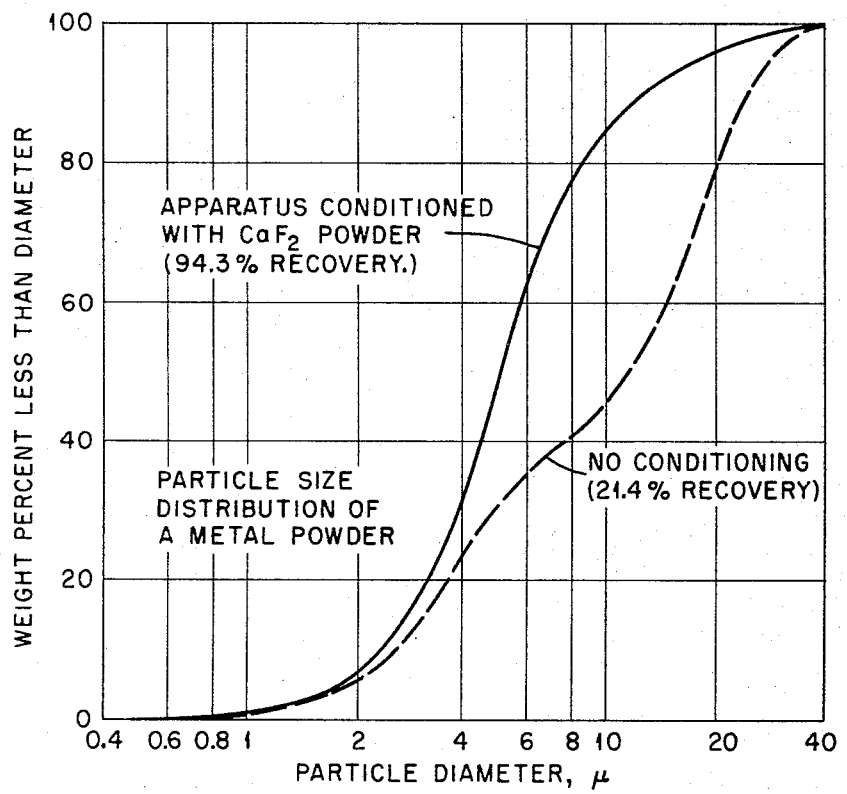

3,333,473
METHOD OF DETERMINING THE PARTICLE SIZE DISTRIBUTION OF A POWDER
Thomas E. Crowder, Concord, Tenn., assignor to the United States of America as represented by the United States Atomic Energy Commission
Filed Apr. 29, 1965, Ser. No. 452,033
3 Claims. (Cl. 73—432)

ABSTRACT OF THE DISCLOSURE

An improvement in a sedimentation method of determining the particle size distribution of a powder by measuring the weight of particles which fall through a gas-filled column as a function of time comprising coating the inside walls of the column with calcium fluoride thereby reducing the amount of metal powder retained on the walls.

My invention relates to methods for determining the particle size distribution of a powder.

One useful method of determining the particle size distribution of a powder is to introduce a sample of the powder into the top of a gas-filled column and measure the weight of particles which fall through the column as a function of time. The particle size distribution is determined from this measurement by application of Stokes' Law for the velocity of particles falling in a gas. In using this method of determining the particle size distribution of a powder a significant quantity of the powder is ordinarily retained in the column and for this reason the powder collected at the bottom may not be representative of the sample. This adversely affects the reliability of the data obtained by this method.

It is one object of my invention to provide a method for improving the accuracy of sedimentation techniques for determining the particle size distribution of a powder.

It is another object to increase the recovery of a sample of powder introduced into a sedimentation column.

Other objects of my invention will be apparent from the following description and the appended claims.

In accordance with my invention I have provided in a sedimentation method for determining the particle size distribution of a metal powder comprising the steps of establishing a gas-filled column, introducing a sample of said powder into said column, collecting at the bottom of the column the powder passing therethrough, and measuring the weight of powder collected as a function of time, an improvement comprising introducing calcium fluoride powder into said column before introducing said metal powder into said column.

The figure shows the particle size distribution of a powder as determined in accordance with my method and the particle size distribution of a sample of the same powder as determined in accordance with a standard procedure not using my method.

My method greatly increases the amount of powder recovered at the bottom of the sedimentation column and the particle size distribution as determined using my method is closer to the actual as determined by photomicrograph measurements than is achieved by sedimentation techniques not incorporating my method.

The mechanism by which my method enhances the metal powder recovery is not known. Although electrostatic charges may be responsible for sample holdup in the sedimentation column, changes in humidity at least over the range of about 35 to 70 percent have no appreciable effect on sample recovery. One possible explanation is that fine particles of $CaF_2$ adhere to the column wall and repel particles of the sample.

In carrying out my method of determining the particle size distribution of a powder a small amount of calcium fluoride powder is introduced into the sedimentation column before the sample of the metal powder is introduced.

The calcium fluoride introduced into the column must comprise small particles, i.e., particles under one micron in diameter. The presence of large particles has substantially no effect, either beneficial or harmful, but merely increases the total weight of calcium fluoride which must be used. One way of characterizing the calcium fluoride powder is by its surface area as determined by nitrogen adsorption methods. The powder should have a surface area greater than one square meter per gram and its surface area is preferably in the range of 10 to 70 square meters per gram.

The quantity of calcium fluoride used is not critical, even small quantities (e.g., one milligram) being of some benefit in increasing the amount of sample recovered. However, to ensure maximum recovery of a sample the calcium fluoride introduced into the column must have a surface area at least as great as the surface area of the inside of the sedimentation column, and the calcium fluoride will preferably have a surface area greater than twice the surface area of the column. For instance, in the examples below, the sedimentation column has an interior surface area of 0.6 square meter, and the calcium fluoride used has a surface area of 36 square meters per gram. In this case the minimum amount of calcium fluoride which should be used is that having a surface area of 0.6 square meter, about 17 milligrams. The preferred amount is greater than 34 milligrams, the weight of calcium fluoride having a surface area of 1.2 square meters, twice the surface area of the inside of the column. Greater quantities of calcium fluoride, of course, may be used.

After the calcium fluoride has been passed through the column, the column may then be cleaned by wiping or washing with alcohol or both to remove loosely adhering particles of calcium fluoride.

The sedimentation column is then ready for the introduction of a sample of a metal powder for its particle size determination.

My method improves the recovery and accuracy of the particle size distribution determination of any metal powder.

Calcium fluoride need not be introduced immediately before each determination since the effects of passing calcium fluoride through the sedimentation column last from 2 to 5 runs.

Having thus described my invention, the following examples are offered to illustrate it in more detail. Example I shows a method of making a particle size distribution determination without using my method, and Example II illustrates my method.

The apparatus used in the following examples for making the particle size distribution measurements comprised a sample introducing portion, a sedimentation column, and a sample collecting portion. The sample introducing portion consisted of a pressure chamber, a sample chamber, and a deagglomerator which is a narrow slit leading into the sedimentation column for breaking agglomerations of the particles. Gas from the pressure chamber was used to expel a powder sample from the sample chamber through the deagglomerator into the sedimentation column. The sedimentation column was an electrically grounded metal tube 85 inches long and 3½ inches in inside diameter. The surface area of the inside of this cylinder was about 0.6 square meter. The sample was collected on a balance pan having means for recording weight collected as a function of time.

Example I

Tungsten powder was placed in the sample chamber of the apparatus described above. The pressure chamber contained nitrogen at 200 pounds per square inch and the width of the deagglomerating slit was 150 microns. The sample was forced into the sedimentation chamber through the slit by the nitrogen gas and was collected at the bottom. The curve of the particle size distribution is given in the figure. Only 21.4 percent of the powder introduced at the top was recovered at the bottom.

Example II

A 60-milligram portion of calcium fluoride, having a surface area of 36 square meters per gram, was introduced into the apparatus used in Example I. The sedimentation column was then rinsed with isopropyl alcohol and thoroughly cleaned by swabbing. A sample of tungsten powder from the same batch as was used for Example I was then introduced into the apparatus in the same manner as for Example I. The recovery of tungsten was 94.3 percent. The particle distribution curve is given in the figure, and corresponds closely to the distribution as determined separately by making photomicrographs of a sample and counting particles.

The above examples are offered to illustrate, not to limit, my invention, and it should be restricted only in accordance with the following claims.

What is claimed is:

1. In a sedimentation method for determining the particle size distribution of a metal powder comprising the steps of establishing a gas-filled column, introducing a sample of said powder into said column, collecting at the bottom of said column the powder passing therethrough, and measuring the weight of powder collected as a function of time, the improvement comprising introducing calcium fluoride powder containing particles having a diameter less than one micron into said column before introducing said metal powder into said column whereby calcium fluoride particles adhere to the internal surface of said column, repel metal particles subsequently introduced, and thereby increase the amount of metal powder recovered at the bottom of said column.

2. The method of claim 1 wherein the surface area of the calcium fluoride introduced is at least as great as the internal surface area of said gas-filled column.

3. The method of claim 1 wherein the surface area of the calcium fluoride introduced is more than twice as great as the internal surface area of said gas-filled column.

References Cited

UNITED STATES PATENTS 2,597,899   5/1952   Payne _____ 73—432

DAVID SCHONBERG, *Primary Examiner.*